Aug. 15, 1939.   R. H. DEAN   2,169,792

GLASS RUN CHANNEL ASSEMBLY

Filed July 12, 1937

INVENTOR.
Roy H. Dean
BY
Barnes, Kisselle, Laughlin & Raisch
ATTORNEYS

Patented Aug. 15, 1939

2,169,792

UNITED STATES PATENT OFFICE 2,169,792

GLASS RUN CHANNEL ASSEMBLY

Roy H. Dean, Detroit, Mich., assignor to General Motors Corporation, Detroit, Mich., a corporation of Delaware Application July 12, 1937, Serial No. 153,114

2 Claims. (Cl. 296—44.5)

This invention relates to a glass run channel assembly and more particularly to a glass run channel assembly for guiding a sliding window glass in an automotive vehicle body.

In the automobile art it has been common practice to guide the up and down sliding window glass along its vertical edges in glass runs comprising a sheet metal run member of channel section lined with felt, pile fabric, or some other suitable cushioning material. The window glass channel shown in the Bailey Patent 1,903,541 is exemplary of this general type of glass run channel. This glass run channel is installed into the window frame and then secured therein by sheet metal screws which are passed through the bottom of the channel. One difficulty with this type of window glass channel has been that in certain cases the screws have not been properly seated so that the heads of the screws are flush with the bottom of the metal channel. Thus the projecting portions of the screws have contacted with the edges of the glass and caused considerable chipping of the glass and even glass breakage.

The fact that the screws have not been properly seated has also caused the cushion lining to wear through at these points and expose the somewhat unsightly screw heads.

It is the object of this invention to remedy the above difficulties. This has been achieved by a glass run assembly wherein the glass run channel is secured in the window frame without passing screws through the bottom of the channel. In particular this arrangement comprises a plurality of spring clips which are first secured in the window frame and a glass run channel which is adapted for, and thereafter snapped into, interengagement with the said clips to secure the same in the window opening.

Figure 1:
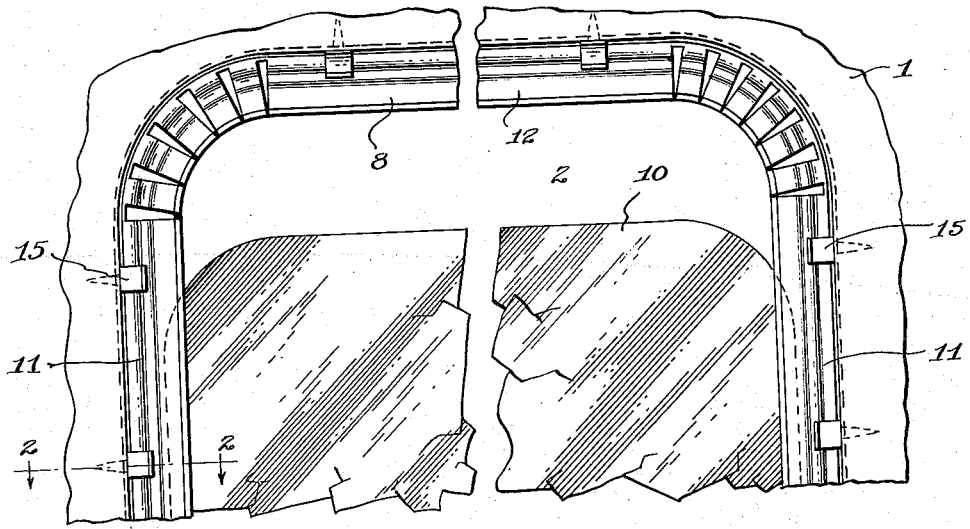
Fig. 1 is a fragmentary elevation with parts broken away showing a sliding automobile window with the window glass run channel assembled in the window frame.

Referring more particularly to the drawing there is shown a portion of a window frame generally designated 1 which defines or forms the perimeter of the window opening 2. The frame 1 on the outside consists of the reveal 3 of the outer door or body panel. The reveal 3 extends completely around the window opening. On the inside the frame 1 consists of the garnish molding 4 which also extends completely around the periphery of the window opening. The reveal 3 is provided with a flange 5 and the garnish molding with a flange 6 which cooperate to form a rabbet 14 for reception of the wnidow glass run generally designated 7.

Figure 2:
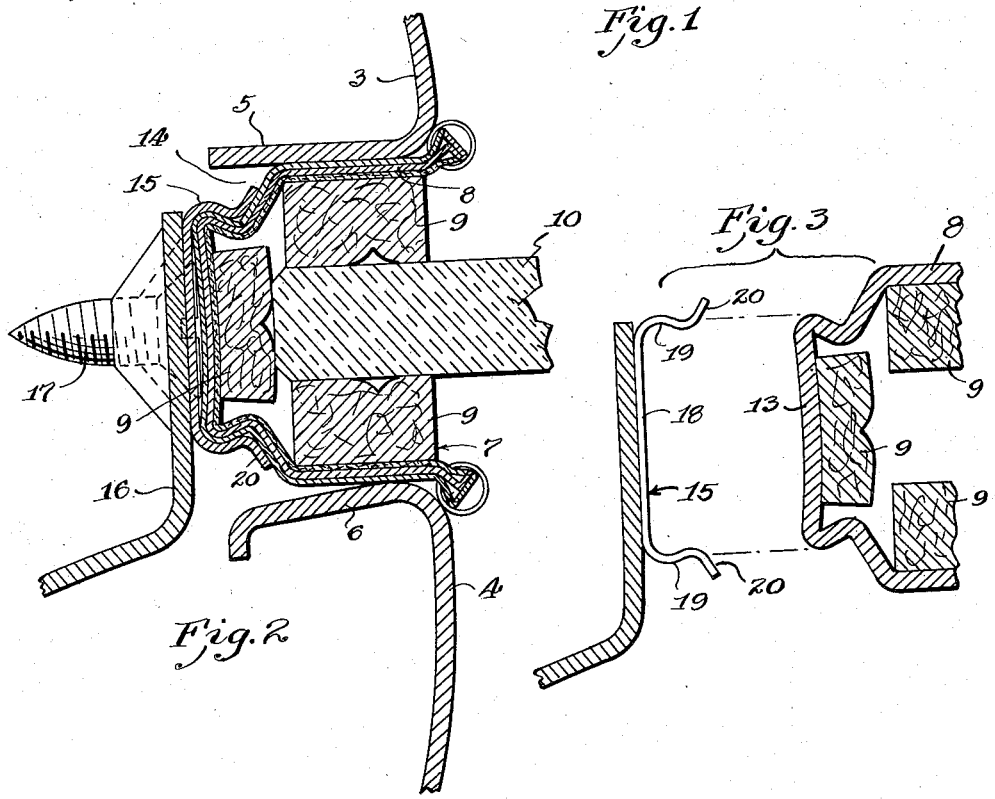
Fig. 2 is a section along the line 2—2 of Fig. 1.
Figure 3:
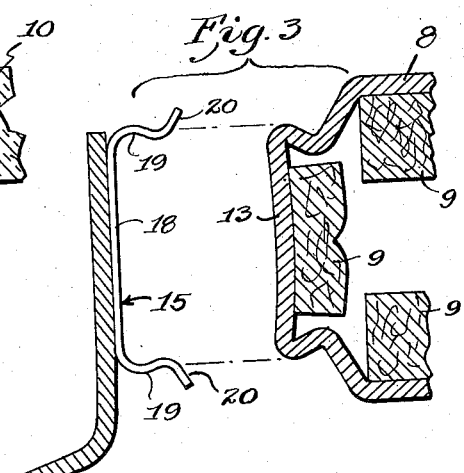
Fig. 3 is a sectional view through the window frame and window guide channel showing the method of assembling the glass run channel into the spring clip retainer.

The glass run is generally of the type shown in the above-mentioned Bailey channel in that it consists of a sheet metal member 8 of channel cross section which has secured therein the sealing and cushioning members 9 of felt, pile fabric or other sealing and cushioning material. The members 9 slidably engage, seal and/or guide the sliding glass 10 along its top and side edges as clearly shown in Fig. 2 in the conventional and well known manner. The glass run channel 8 is one piece consisting of the side portions 11 which extend along the sides of the window frame and the top portion 12 which extends across the top of the window frame. The channel 8 can be defined as a U channel because the top portion 12 and side portions 11 form a U. As shown in Figs. 2 and 3, the bottom of the glass run channel takes the form of a dovetail section 13.

The glass run channel is arranged to have a snap-in interengagement with the window frame in the window opening. This snap-in interengagement between the glass run channel and the window frame is preferably achieved by a plurality of spaced spring clips 15 positioned along the top and sides of the window opening. A plurality of spring clips 15 are mounted within the rabbet 14 and upon the clip support members 16 which are fixed to the door or body pillars or other portion of the body not shown. The clips 15 can be secured to the support member 16 in any suitable manner. As herein shown each clip is secured to the support 16 by a sheet metal screw 17 which passes through suitable openings in the bottom 18 of the clip 15 and in the support member 16. The clips 15 are made of spring steel and the side walls 19 converge inwardly to form a spring socket which receives the dovetail member 13. The side walls 19 are provided with diverging edge portions 20 which form a mouth for guiding the glass run channel dovetail 13 into the spring clip 15. The spring clips 15 are mounted along the sides and top of the window frame preferably in spaced relation.

The glass run channel 8 is made of any suitable flexible material such as sheet metal so that the side portions 11 can be swung or flexed toward and away from each other. To install the glass run channel in the window frame the side portions 11 are drawn toward each other sufficiently to permit the top portion 12 to be inserted in the rabbet 14. The dovetail 13 of the top portion 12 of the channel 8 is then snapped into interengagement with the clips 15 along the top of the window opening. Then the side portions 11 are flexed or swung away from each other and inserted in the side portions of the rabbet 14 and the dovetails 13 of the side portions 11 of the channel 8 are snapped into engagement with the spring clips 15 along the sides of the window opening.

From the above it is evident that the glass run channel 8 is secured in the window opening so that it conceals the clips 15 and screws 17 thus improving the appearance of the glass run assembly. It is also evident that there is no securing means such as screws or the like which pass through the channel member 8.

It is, of course, appreciated that the glass run serves as a guide for the sliding window panel 10 as well as a weatherseal for the edges of the panel.

I claim:

1. In an automotive vehicle body having a frame with a rabbet defining a window opening and a window panel slidable in said opening, a glass run adapted for guiding and sealing the said panel along the side and top edges comprising a U channel member having top and side portions adapted to be positioned in said rabbet respectively along the top and sides of the said window frame, and a plurality of spaced snap fasteners for securing the said U channel member to the said window frame, each consisting of a dovetail male member fixed to the base of said U channel member and a spring clip female member fixed to the bottom of the rabbet in said window frame and adapted to have a snap-in interengagement with the said dovetail male member.

2. In an automotive vehicle body having a frame with a rabbet defining a window opening and a window panel slidable in the said opening, a glass run adapted for guiding and sealing the said panel along the side and top edges comprising a flexible U channel member having top and side portions adapted to be positioned in the rabbet respectively along the top and sides of said window frame, the said U channel member having its bottom shaped in the form of a dovetail, and a plurality of spring clip socket members secured in spaced relation to the bottom of the rabbet in said window frame adapted to resiliency interengage the said dovetail portion of the channel member to secure the channel member in the said window frame.

ROY H. DEAN.